No. 826,194.
PATENTED JULY 17, 1906.
J. J. REXROTH.
THRUST OR END MOVEMENT MECHANISM.
APPLICATION FILED NOV. 4, 1901.
3 SHEETS—SHEET 1.
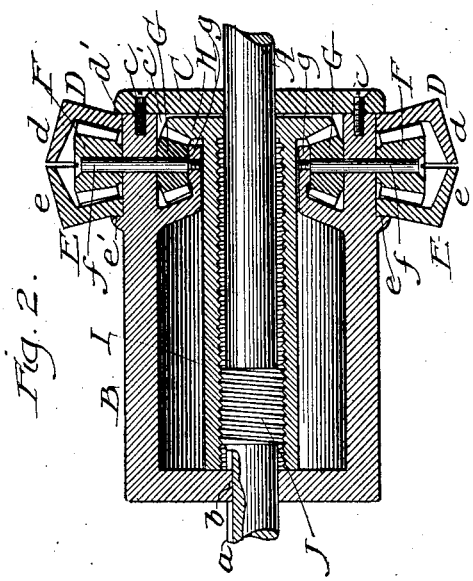
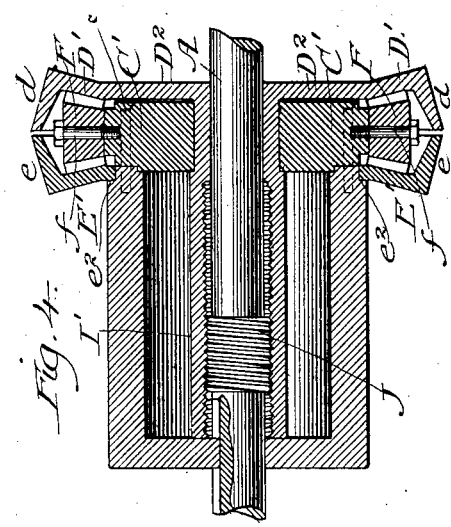
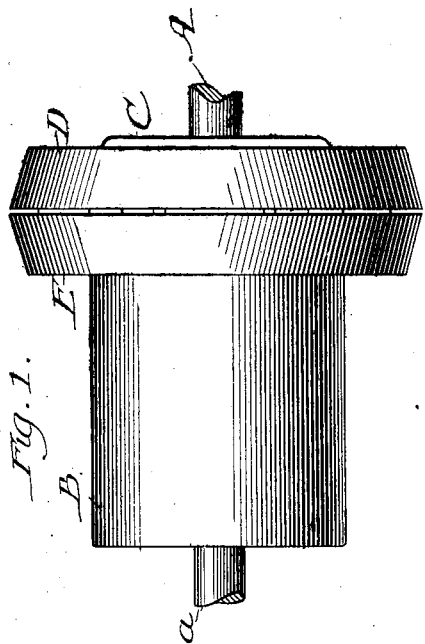
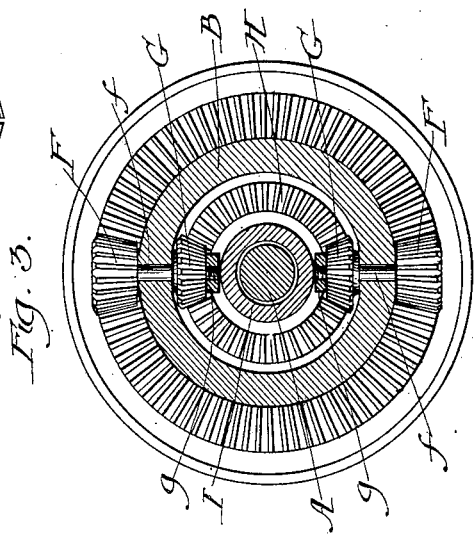
Witnesses:
Frank Blanchard
Wm. Geiger
Inventor:
John J. Rexroth
By Oscar W. Bond
Attorney.

No. 826,194. PATENTED JULY 17, 1906.
J. J. REXROTH.
THRUST OR END MOVEMENT MECHANISM.
APPLICATION FILED NOV. 4, 1901.
3 SHEETS—SHEET 2.
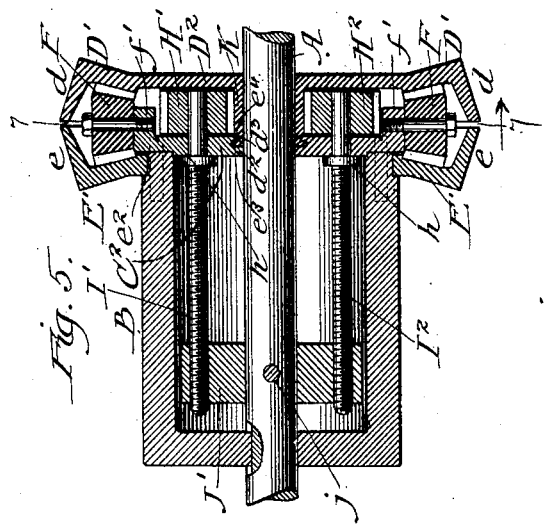
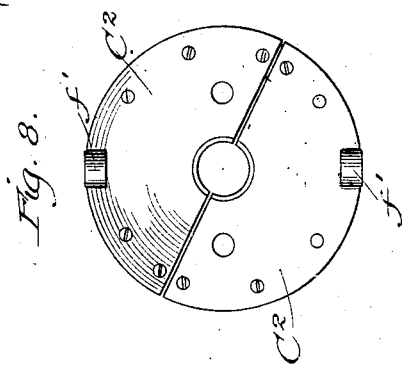
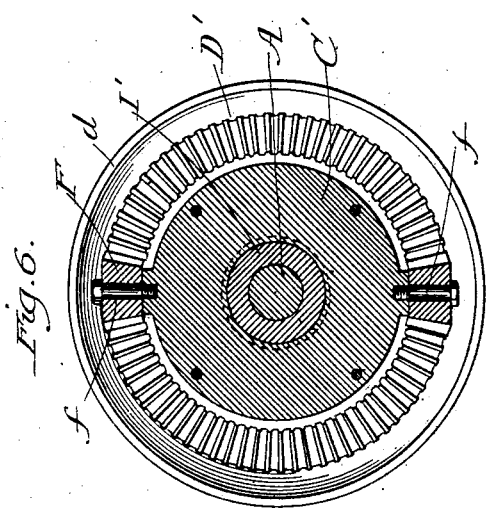
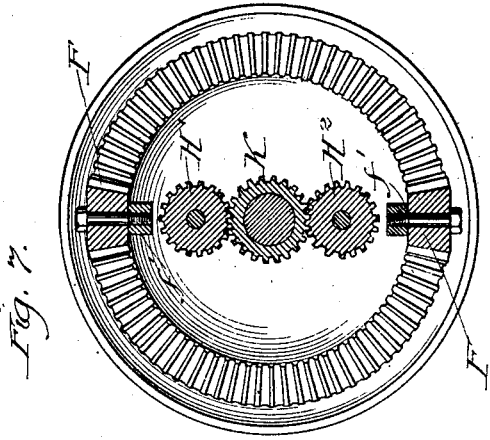
Witnesses:
Frank Blanchard
Wm. Geiger
Inventor:
John J. Rexroth
By Oscar W. Bond
Attorney.

No. 826,194. PATENTED JULY 17, 1906.
J. J. REXROTH.
THRUST OR END MOVEMENT MECHANISM.
APPLICATION FILED NOV. 4, 1901.
3 SHEETS—SHEET 3.
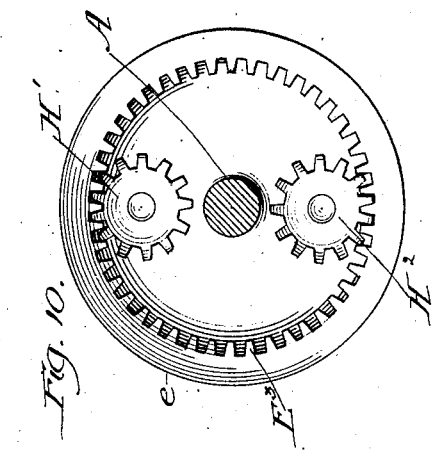
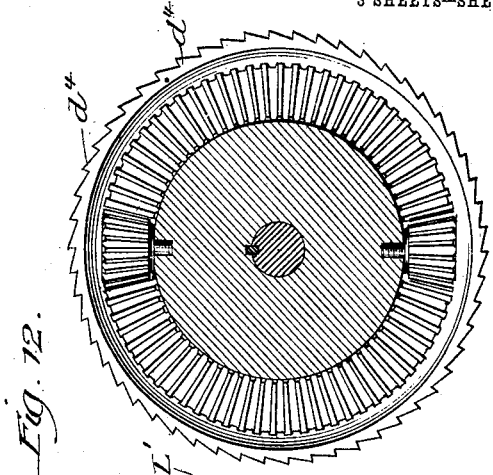
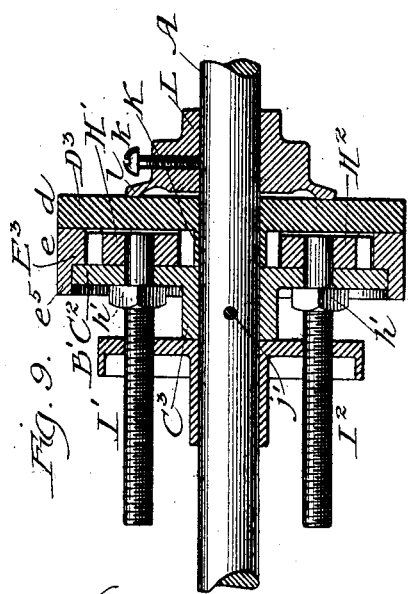
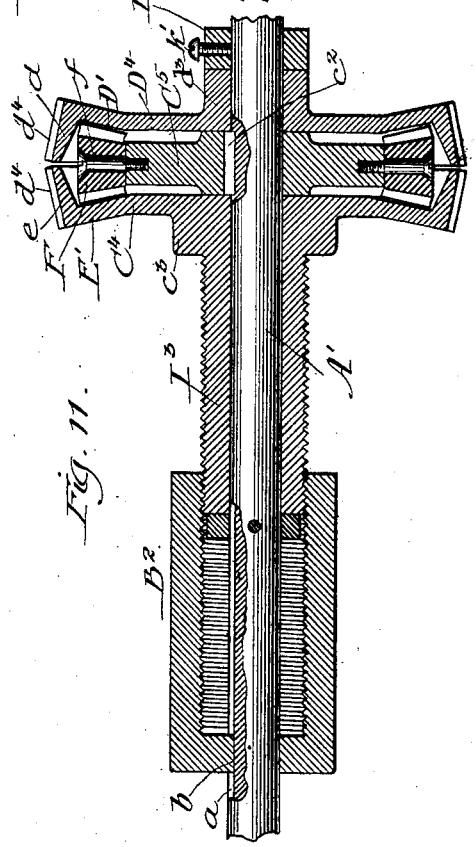
Witnesses:
Frank Blanchard
Wm. Geiger.
Inventor:
John J. Rexroth
By Oscar W. Bond
Attorney.
THE NORRIS PETERS CO., WASHINGTON, D.C.

UNITED STATES PATENT OFFICE.

JOHN J. REXROTH, OF CHICAGO, ILLINOIS, ASSIGNOR OF ONE-FOURTH TO WILLIAM W. WEAVER, OF CHICAGO, ILLINOIS.

THRUST OR END MOVEMENT MECHANISM.

No. 826,194.   Specification of Letters Patent.   Patented July 17, 1906.

Application filed November 4, 1901. Serial No. 81,028.

*To all whom it may concern:*

Be it known that I, JOHN J. REXROTH, a citizen of the United States, residing at Chicago, in the county of Cook and State of Illinois, have invented certain new and useful Improvements in Thrust or End Movement Mechanism, of which the following is a specification.

It is desirable and necessary for many uses and purposes to apply to a shaft for operation thereon and therewith connecting means rotatable with the shaft and having endwise travel on the shaft for producing a thrust or end movement by which an engagement between the shaft and a power-transmitting appliance can be effected and which can be used generally where it is necessary to connect and disconnect a shaft from a driven part.

The object of this invention is to construct a simple, reliable, and effectual thrust or end movement mechanism mounted on and adapted to be given a travel endwise on a shaft in either direction without retarding the speed or changing the direction of rotation of the shaft; to throw the confinement of a thrust or end movement or position of a sleeve or collar onto the shaft itself, so that the mechanism is self-contained with the shaft, avoiding the employment of end-thrust bearings or other means actuated independent of the shaft, rendering the shaft its own means for producing the thrust or end movement; to enable the thrust or end movement to be quickly and readily attained without inconvenience or trouble and directly through the shaft; to actuate the thrust or end movement mechanism from the rotation of the shaft; to enable the engagement between the shaft and the driven part to be effected without appreciable jar or concussion and without the production of injurious effects or excess of strain in making the connection; to give the thrust or end movement mechanism a quick travel in both directions on the shaft; to stop the action of the thrust or end movement mechanism in one direction when operative in the other direction and to render the thrust or end movement mechanism inoperative in either direction at will and free to revolve with the shaft without endwise movement thereon, and to improve generally the mechanism as a whole.

The invention consists in the features of construction and combinations of parts hereinafter described and claimed.

The essential and important feature of obtaining a thrust or end movement on a shaft wholly from the rotation of the shaft, so that the thrust or end movement will, in effect, be self-contained, can be accomplished in various ways so long as the mechanism depends for its operation in attaining the result of a thrust or end movement directly from the rotation of the shaft.

In the drawings illustrating the invention several varieties of arrangement for attaining the objects sought are illustrated, all of which operate on the same principle so far as pertains to the placing of and control of the thrust or end movement directly on the shaft, and in the drawings—

Figure 1 is a plan view of one form of mechanism for carrying out the invention; Fig. 2, a sectional elevation of the mechanism shown in Fig. 1; Fig. 3, a cross-section showing the connecting-gear and its arrangement for the construction of Figs. 1 and 2; Fig. 4, a sectional elevation showing a modified form of the construction of mechanism in which the intermediate gear on the advancing and receding screw is dispensed with; Fig. 5, a sectional elevation of another modified form of construction and arrangement for the mechanism in which the connecting-gear actuates two screws; Fig. 6, a cross-section showing the bevel gear and pinions for the construction of Fig. 5; Fig. 7, a cross-section on line 7 of Fig. 5 looking in the direction of the arrow; Fig. 8, a face view of the plate carrying the pinions for driving the screws; Fig. 9, a sectional elevation showing a modified construction for the form of mechanism of Fig. 5, employing two actuating-screws, dispensing with the bevel gears and pinions of the construction of Fig. 5; Fig. 10, a cross-section face view of the construction and arrangement of gear shown in Fig. 9; Fig. 11, a sectional elevation showing another modification in the construction of the mechanism employing a threaded stem and a sliding sleeve or cylinder, and Fig. 12 a cross-section showing the arrangement of the gear for the construction of Fig. 11.

The essential feature found in the exemplifications of this invention shown in the drawings is a self-contained mechanism mounted on and operated from the shaft and the primary elements of the mechanism, as illustrated, a traveling member in the form of a slidable sleeve, cylinder, or disk, and a fixed member in the form of a fixed thread or a fixed collar, with a connection between the two, preferably a threaded stem or screw-gear actuated from the rotation of the shaft to have a right and left rotation given thereto to produce a thrust or endwise movement or change of position of the traveling member by which the actual work is performed.

The thrust or end movement mechanism is mounted on a shaft A, which may be a line or other shaft for imparting power driven from any suitable source of power. The mechanism employs in its construction, as shown in Figs. 1, 2, and 3, a sleeve or cylinder B, constituting the movable member of the mechanism and having one end closed and preferably formed integral with the body of the sleeve or cylinder, but which can be a separate head suitably attached to the end of the sleeve or cylinder, and this closed end or head of the sleeve or cylinder carries a spline or key b, rigidly secured thereto and entering into a slot or way a in the shaft, so as to lock the sleeve or cylinder to the shaft for rotation therewith. The opposite end of the sleeve or cylinder is closed by a cap or head C, which can be secured thereto by lag-screws c or in any other suitable manner, and, as shown, the inner face of the end or head has a ledge or flange c', fitting close against the inner face of the wall or body of the sleeve or cylinder, so as to give a solid and firm connection and support between the sleeve or cylinder and the cap or head. A bevel-gear ring D is mounted loosely on the sleeve or cylinder B adjacent to the end plate or head C, and, as shown, the periphery of the plate extends beyond the exterior of the sleeve or cylinder and forms a stop or rest d' for holding the ring-gear against endwise movement in the direction of the end plate or head, and a companion bevel-gear ring E is also loosely mounted on the sleeve or cylinder B and, as shown, is held against endwise movement on the sleeve or cylinder in one direction by the stop or rest e' on the exterior face of the sleeve or cylinder, as shown in Fig. 2. Each bevel-gear ring D and E has its gear on the inner face, and, as shown, each ring has an inwardly-extending rim, one of which, d, furnishes a friction-face for controlling the ring-gear D, and the other of which, e, furnishes a friction-face for controlling the ring-gear E, both faces being engaged by a suitable friction-applying device, (not shown,) so that by applying the friction either one of the ring-gears can be held against rotation, leaving the other ring-gear free to revolve.

Between the two ring-gears D and E in line opposite to each other are two bevel pinions or gears F, the cogs of which mesh with the cogs of both ring-gears, as shown in Figs. 2 and 3. Each bevel pinion or gear F is mounted on a pin or shaft f, supported in the body or wall of the sleeve or cylinder and so located as to properly mesh the pinion and gears, and on the inner end of each pin or shaft f is a bevel gear or pinion G, located between the inner face of the wall of the sleeve or cylinder and a step g, extending down from the wall, so as to leave the gear or pinion free to revolve. The gear or pinion G meshes with a bevel-gear H, formed with or suitably secured to the end of a hollow screw I, having an internal thread engaging a thread J, constituting the fixed member of the mechanism on the shaft A, which thread J is a fixed fulcrum on the shaft against which the screw operates as it is rotated to force or draw the sleeve or cylinder endwise on the shaft as a support, such movement of the sleeve or cylinder being permitted by the spline and way locking the sleeve or cylinder to the shaft.

The operation is as follows: The application of friction either by the hand of the operator or a suitable brake shoe or block to the friction-face of the rim d sufficient to hold such ring against rotation leaves the gear-ring E free to revolve, imparting rotation to the gear or pinion F, driving the gear or pinion G, which in turn drives the gear H and revolves the screw I for the screw to act on the fixed fulcrum of the shaft and force the sleeve or cylinder in one direction on the shaft from the rotation of the shaft. The application of frictional force to the face of the rim e sufficient to stop the gear-ring E causes the gear-ring E to drive the pinion F in the opposite direction to that of the gear-ring D imparting an opposite rotation to the gear or pinion G and driving the gear H in the opposite direction to that first described, reversing the travel of the screw I on the fixed fulcrum of the shaft and giving a thrust or end movement in the opposite direction to the sleeve or cylinder. It will thus be seen that by merely applying a frictional force to either rim d or e the gear-ring of the rim to which the frictional force is applied will be stopped, leaving the opposite gear-ring free to revolve for the revolution thereof to revolve the gears or pinions F and G and impart rotation to the gear H, by which the screw I will be advanced or receded on the fixed fulcrum of the shaft, according as to which ring-gear is doing the work, it being understood that the ring-gears operate in opposite directions, thereby advancing or receding the screw on the fixed fulcrum to give a corresponding movement or thrust to the sleeve or cylinder. The gear H abuts against the inner face of the end plate or cap C, the end screw I abuts against the inner face of the cap or head of the sleeve or cylinder B, so that no matter which way the screw is revolved it will operate against a plate or head, giving a thrust or endwise movement or travel in a straight line to the sleeve or cylinder, and this thrust or travel will be obtained without retarding the speed of the shaft or changing the direction of rotation, as the shaft supports and carries the mechanism by which the thrust or end movement is attained, so that such mechanism is, in effect, a part of the shaft, revolving therewith, thus avoiding the necessity of retarding the rotation or changing the direction of rotation of the shaft in order to obtain a thrust or end movement or change the position of the sleeve or cylinder for any purpose desired. The sleeve or cylinder revolves coincident with the shaft by reason of its feathered connection therewith, and such rotation of the sleeve or cylinder carries with it the gears mounted thereon and connected therewith, and the gear connection rotates the screw when one or the other of the gear-rings is locked against revolving, and if neither gear-ring is locked, but both are free, the entire mechanism can revolve with the shaft without having the screw act on the fixed fulcrum to advance or recede the mechanism. It will thus be seen that by the use of the mechanism of this invention the shaft carries the mechanism and the mechanism operates from and on the shaft to produce a thrust or end movement or change of position for the sleeve or cylinder. The sleeve or cylinder can have applied to its closed end a bearing-plate or other means for engaging the thrust or end movement mechanism with a pulley or other appliance, so as to drive the pulley or other appliance from the shaft, and the advance of the thrust or end movement mechanism can be made rapid or slow, according to the frictional force exerted on the non-acting ring-gear, thus enabling an approach to be gradually made for impingement or contact of the sleeve or cylinder with the appliance to be driven, and as the thrust or end movement mechanism is moving on the shaft and revolving therewith it is evident that the engagement or connection can be made without any jar or concussion, which will produce injurious effects or breakage.

The modified construction shown in Fig. 4 of the drawings has the shaft A, with the fixed fulcrum thereon in the shape of the thread, constituting the fixed number of the mechanism the same as for the construction of Figs. 1, 2, and 3, and this shaft is encircled and has mounted thereon, by a spline and way, a sleeve or cylinder B, as described for the construction of Figs. 1 and 2 and constituting the movable member of the mechanism. The construction of Fig. 4 has a head or plate C' attached to the end of the sleeve or cylinder by screws or lag-bolts c or in any other suitable manner. This plate or head C has on opposite sides thereof bevel pinions or gears F, each carried by a pin or shaft f, screw-threaded into the head or plate, and each gear or pinion F meshes with the gear-ring D' on one side and the gear-ring E' on the opposite side, the gear-ring E' being loosely mounted on the sleeve or cylinder between a shoulder $e^2$ on the sleeve or cylinder and the face of the plate or head. The ring-gear D' has a rim d and the ring-gear E' has a rim e, each rim having a friction-face, the same as described for the rims d and e in the construction of Figs. 1, 2, and 3, and for the same purpose. The ring-gear D', as shown in Fig. 4, is formed integral with an end plate or disk $D^2$, extending out from which is a screw I', having an internal screw-thread working on the fixed fulcrum J on the shaft A, as described, for the screw I of the construction of Figs. 1, 2, and 3. The plate or head C', as shown, is shouldered, and the end of the sleeve or cylinder is recessed so as to make a solid connection between the end of the sleeve or cylinder and the head or cap, and the base of the screw adjacent to the plate or disk $D^2$ is recessed to receive the plate or head C' and lock the plate or head to the screw, so that when the parts are assembled the sleeve or cylinder and the plate or head and the gears and the screw will all be united and move as one.

The operation is the same, essentially, as described for the operation of the mechanism of Figs. 1, 2, and 3. The application of sufficient frictional force to stop the rotation of one of the gear-rings causes the opposite gear-ring to revolve with the gear or pinion F for such gear or pinion to actuate the screw in reverse directions, according as to which gear-ring is stopped for the screw to operate on the fixed fulcrum of the shaft, and give the sleeve or cylinder a thrust or end movement or change of position, the same as described for the construction of Figs. 1, 2, and 3 in the operation of that mechanism. The screen abuts at its end against the closed end wall or head of the sleeve or cylinder and is locked in the other direction by the engagement of the plate or head C' with the base of the screw, so that the rotation of the screw in opposite directions will impart a thrust or end movement to the sleeve or cylinder.

The modified construction shown in Figs. 5, 6, 7, and 8 of the drawings has the shaft A and the sleeve or cylinder B and constituting the movable member of the mechanism locked thereto by a spline or key b and the way or groove a, so as to revolve with the shaft and be capable of endwise movement. The open end of the sleeve or cylinder has secured thereto by screws or lag-bolts c or otherwise a plate or disk $C^2$, and on the shaft, parallel with the plate or disk $C^2$, is a plate or disk $D^2$, which, as shown, is connected with the plate or disk $C^2$ by an annular tongue $d^2$, which enters a recess $e^3$ in the plate or disk $C^2$, and an annular tongue $e^4$, which enters a recess $d^3$ in the hub of the gear extending out from the plate D², which locks the two plates or disks one to the other. The plate or disk D² has in the construction shown formed integral therewith a bevel ring-gear D' and a companion bevel ring-gear E', loosely mounted on the exterior of the sleeve or cylinder, and is held in place between a shoulder $e^2$ on the sleeve or cylinder and the face of the plate or disk, and, as shown, the plate or disk is shouldered and enters a recess in the end of the sleeve or cylinder, so as to furnish a firm connection between the sleeve or cylinder and the plate or disk C² when the parts are assembled. The two ring-gears D' and E' mesh with a bevel pinion or gear F, mounted on a pin or shaft $f$, screw-threaded into a lug or ear $f'$, there being two such ears projecting out from the face of the plate or disk C² on opposite sides thereof and in line with each other, so as to locate pinions or gears on opposite sides of the shaft and in line with each other, both pinions or gears meshing with the gear-rings. The plate C² is made in two halves or sections, each half or section having a groove and tongue to receive the tongue and groove of the gear-hub upon the plate or disk D², by which arrangement the two plates can be locked together, for which purpose one section or half of the plate C² is entered into position to receive the end gear-hub and the other section of the plate is then entered into position, so that the two sections form a complete plate or disk with the gear-hub connected therewith, and the plate is secured to the end of the sleeve or cylinder by screws, the holes for entering the screws being arranged as shown in Fig. 8, so as not to interfere with the admission of the actuating-screws for advancing and receding the sleeve or cylinder. The ring-gear D' has a rim $d$ and the ring-gear E' has a rim $e$, each rim having a friction-face for the purpose described for such faces in the construction of mechanism of Figs. 1, 2, and 3. The plate or disk D² has attached thereto or formed therewith a gear K, the hub of which forms the connection between the two disks or plates, as already described. The gear K meshes with the gear H' on one side and a gear H² on the opposite side, the two gears being in central line with each other and with the gear K, as shown in Fig. 7, with the gear K mounted on the shaft A and free to turn or revolve thereon. The gear H' is fixedly attached to a screw I', having an external screw-thread, and the gear H² is fixedly attached to the end of a screw I², having an external screw-thread, and each screw is mounted in the plate or disk C², so as to be free to turn therein and is held in place between its gear and a collar or flange $h$ on the screw, as shown in Fig. 5. Each screw I' and I² is entered into a collar J', constituting the fixed member of the mechanism, and attached to the shaft A, so as to be fixed on the shaft and form a fixed fulcrum corresponding to and performing the work of the threaded fixed fulcrum of the construction of Figs, 1, 2, and 3 and for the same purpose, except that in the construction of Figs. 5, 6, 7, and 8 the screws are externally threaded instead of having interior threads and two screws are used instead of one screw or stem, as in the construction of Figs. 1, 2, and 3.

The operation of the mechanism of Fig. 5 is in all material respects the same as the operation of the mechanism of Figs. 1, 2, and 3. The application of a frictional force to either of the friction surfaces or faces of the rims $d$ and $e$ stops the rotation of the ring-gear having the rim to which the friction is applied, permitting the other ring-gear to operate, and such operation of the gear will through the intermeshing gears K and H' and H² rotate the screws I' and I², advancing and receding the screws in the fixed fulcrum to give a thrust or endwise movement or change of position to the sleeve or cylinder for the same purpose as described in relation to the construction of Figs. 1, 2, and 3.

The modified form of construction shown in Figs. 9 and 10 has mounted slidably on the shaft a disk or plate B', constituting the movable member of the mechanism, and which is to be advanced and receded, corresponding in this respect to the motions of the sleeve or cylinder hereinbefore described. A plate or disk C², having a hub or bearing C³, is fixed on the shaft and constitutes the fixed member of the mechanism, and a plate or disk D³ is also mounted on the shaft and free to revolve thereon. A gear-ring E³, having a side flange or rim $e^5$, encircling the periphery of the plate or disk C², is located between the plates D³ and C², and the periphery $d$ of the plate D³ and the periphery $e$ of the ring E³ form frictional faces corresponding to the frictional faces on the rims $d$ and $e$, hereinbefore described. At the axial center of the plate D³ is a gear K, which meshes with a gear H' on one side and a gear H² on the opposite side, both of which are in mesh with the gear-ring E³, and the gear H' is fixed on the end of a threaded stem or screw I', and the gear H² is fixed on the end of a threaded stem or screw I², the ends of the stems or screws for attachment of the gears extending through the carrying plate or disk C², and the stems or screws are held in place between the gears and a lock-nut $h'$ on each threaded stem or screw. The arrangement of gears and threaded stems or screws is essentially the same as the arrangement for these parts for the construction of Fig. 5; but the threaded stems or screws instead of coacting with a fixed fulcrum on the shaft operate in the plate or disk B', passing through screw-threaded holes in the plate or disk for that purpose. The carrying plate or disk C² is fixedly attached to the shaft by a pin $j'$, passing through the shaft and the hub of the disk or plate, and a collar L, having a small bearing-face $l$, abuts against the outer face of the plate or disk $D^3$ and is held in place and locked to the shaft by a set-screw $k$, so that the two plates or disks and the gears and the threaded stems or screws are held in a fixed relation on the shaft for the rotation of the threaded stems or screws to advance and recede the plate or disk B'. The application of sufficient frictional force to the periphery of the disk or plate $D^3$ or of the ring $E^3$ stops the rotation of the plate or ring, accordingly as to which of them has the friction applied thereto, and with the stoppage of either one the other is free to revolve with the shaft, giving a direction of travel to the threaded stems or screws in the right or left direction, according to the stoppage, and the rotation of the screws acting on the plate or disk will give the plate or disk an advancing or a receding movement. The operation is essentially the same in all material respects as described for the operation of the construction of Figs. 1, 2, and 3, it being understood that the application of a frictional force causes the train of gear to actuate the threaded stems or screws in one direction or the other as described for the rotation of the threaded stem or screw in the construction of Figs. 1, 2, and 3, differing, however, in that in the construction of Figs. 1, 2, and 3 the sleeve or cylinder is moved endwise on the shaft together with the threaded stem or screw and its actuating-gears, while in the construction of Fig. 9 the actuating-gears and the threaded stems or screws are stationary and the plate or disk, operated from the stems or screws, is moved endwise on the shaft.

The modified form of construction shown in Figs. 11 and 12 has a sleeve or cylinder $B^2$ slidably mounted on the shaft by means of a spline or tongue $b$ and a groove or way $a$ in the shaft, and this sleeve or cylinder constitutes the movable member of the mechanism and is provided on its interior with a screw-thread entered into which is a stem having an exterior screw-thread. A plate or disk $C^4$, having a hub $c^3$, is formed with or suitably secured to the threaded stem or screw $I^3$ and has a bevel-gear E', and a plate or disk $D^4$, having a hub $d^3$, mounted on the shaft, has a bevel-gear D', and, as shown, each bevel-gear has a rim corresponding to the rims $d$ and $e$ of the construction of Figs. 1, 2, and 3, except that each rim instead of having a frictional face is provided with ratchet-teeth $d^4$ for the engagement of the ratchet, by means of which one gear can be locked against rotation with the other gear free to rotate. A bevel gear or pinion F on a stem or shaft $f$ is located between the bevel-gears on each side of a disk $C^5$, into which the stems or shafts of the bevel-gears are screw-threaded, so as to have the gears opposite each other and in line with both gears engaged with bevel-gears D' and E', and the disk or head $C^5$ is fixedly attached to the shaft A by a key $c^2$, so as to revolve with the shaft and have the revolution therefrom through the gears operate the threaded stem or screw $I^3$, constituting the fixed member of the mechanism, to advance or recede the sleeve or cylinder $B^2$. A collar L' is fixed to the shaft A by a set-screw $k'$ and abuts against the hub $d^3$ of the plate or disk $D^4$ to hold the parts against end movement on the shaft.

The operation in all material respects, so far as producing a thrust or endwise movement is concerned, is essentially the same as already described for the construction of Figs. 1, 2, and 3. The locking of one of the bevel-gears of the plates or disks with the other gear free causes the bevel-pinion and the gears and the free gear to give a rotation to the threaded stem or screw for moving the sleeve or cylinder in one direction, and the lock of the free gear leaves the other gear in condition to revolve the gears and operate the threaded stem or screw in the opposite direction, giving a reverse travel to the sleeve or cylinder.

It will be seen that all of the constructions embody the principle of traveling a sleeve or cylinder or a collar or disk endwise on the shaft directly through the rotation of the shaft, and it is to be understood that, broadly speaking, the invention utilizes a traveling member mounted on and revolving with the shaft and endwise slidable thereon and a fixed member on the shaft, the two members having a connection between them actuated from the rotation of the shaft, by which the traveling member will be moved endwise in both directions on the shaft. The traveling member can be either a sleeve or cylinder or a disk or plate or any other suitable device adapted to be mounted on the shaft and fixed thereto to revolve therewith and having an endwise movement, and the fixed member can be a threaded portion on the shaft or a plate or other device attached to the shaft, and the traveling member can carry the actuating means for attaining the thrust or endwise movement, or the fixed member can carry such means, so long as the construction and arrangement of the devices are such as to impart a direct action from the rotation of the shaft to accomplish the desired end of giving an endwise sliding movement to the traveling member on the shaft.

The stopping or locking of one ring-gear causes the stopped or locked gear to furnish a track or face for the engagement of the intermediate pinions or gears which are carried around with the revolving of the shaft and the traveling member for such carrying around to rotate the intermediate pinions or gears, and the rotation of these pinions or gears is permitted by having the free ring-gear to revolve, such gear having twice the speed of the shaft and the traveling member. The ring-gears operate on opposite sides of the intermediate pinions or gears, with the result that with the stopping or locking of one of the ring-gears the interposed pinions or gears will be driven in one direction, and that with the stopping or locking of the opposite ring-gear the interposed pinions or gears will be driven in the reverse direction, thus enabling the interposed pinions or gears to be driven in either direction as required to impart a right or left rotation to the threaded stem or screw to give the traveling member the proper direction of travel. This stopping or locking principle also pertains to the constructions not employing the ring-gears, but using a center or axial pinion or gear and a pair of pinions or gears, one on each side of the center or axial pinion or gear. The axial or center pinion or gear is carried by a stop or lock plate or disk, and the pair of pinions or gears are carried also by another stop or lock plate or disk, so that with the stoppage of the plate or disk the one pinion or gear or the pair of pinions or gears are held to furnish a track or face as in the ring-gear arrangement, and as the pair of pinions or gears are on opposite sides of the axial or center pinion or gear the threaded stems or screws will be given a right or left rotation, according to which plate or disk is locked or stopped to move the traveling member as required. It will thus be seen that by the employment of a system of gears either section of which can be locked or stopped with the other section free a right and left rotation will be given to the operating threaded stem or screw to travel the sliding member back and forth on the shaft endwise, and such movement is allowed solely from the revolving of the shaft in conjunction with a gear system either section of which can be locked or stopped as required. The gear operates axially around the shaft, giving a straight-line thrust or end movement to the traveling member, thereby insuring precision and ease in making an engagement, and the mechanism is a unit with the shaft, operated therefrom and self-contained with the shaft, all of which adds to utility in use.

The essential and main features of the invention are the locating and operating of a thrust or end movement mechanism upon and by a shaft, the mechanism consisting of a "traveling" member, by which is meant a member having as a whole an endwise movement or travel on the shaft, and a "fixed" member, by which is meant a member having a fixed relation and held against endwise movement on the shaft, both members, however, revolving with the shaft, and the operation being one by which a unity and parallelism of movement for the traveling member will be given thereto, and while the construction and arrangement of the parts are described with more or less minuteness of detail it is to be understood that it is not the intention to limit the invention thereto nor to be limited thereby unduly any more than is pointed out in the claims, as it is contemplated to make all proper changes in form, construction, and arrangement, and the omission of immaterial elements and the substitution of equivalents as circumstances may suggest or necessity render expedient.

It is to be understood that for stopping or locking one section of the gear system either the friction-faces or the ratchet-faces can be employed or any other means suitable for the purpose can be used, and the thrust end movement or change of position of the traveling member of the mechanism can be produced when the shaft is at rest by oscillating one member of the friction, ratchet, or other device with the other member stopped or locked, as in operating the mechanism from the shaft for the oscillating movement to actuate the threaded stem or screw to move the traveling member on the shaft in the direction required. It will thus be seen that the mechanism is operative either with the shaft running or at rest and that in either case the action is in a direct line on the shaft and parallel therewith, so as to have the force exerted axially around and concentric with the shaft, thus reducing friction on the shaft in moving the traveling member to a minimum and insuring a positive engagement.

What I claim as new, and desire to secure by Letters Patent, is—

1. In a thrust or end movement mechanism, the combination of a revoluble power-transmitting shaft, a traveling member mounted on and traveling with the shaft and endwise slidable thereon, a fixed member on the shaft, and a gear and right and left revoluble screw constituting a connection between the fixed member and the traveling member, actuated from the revolving of the shaft and adapted to give the traveling member a thrust or end movement in one or the other direction on the shaft, substantially as described.

2. In a thrust or end movement mechanism, the combination of a revoluble power-transmitting shaft, a traveling member mounted on and revolving with the shaft and endwise slidable thereon, a fixed member on the shaft, and a screw and gears operated from the revolving of the shaft to have a right or left rotation given thereto to move the traveling member in one or the other direction on the shaft, substantially as described.

3. In a thrust or end movement mechanism, the combination of a revoluble power-transmitting shaft, a traveling member mounted on and revolving with the shaft and endwise slidable thereon, a fixed member on the shaft, a screw, and a system of gearing, actuated from the rotation of the shaft in the same direction and giving a right or left rotation to the screw for moving the traveling member in one or the other direction on the shaft, substantially as described.

4. In a thrust or end movement mechanism, the combination of a revoluble power-transmitting shaft, a traveling member mounted on and revolving with the shaft and endwise slidable thereon, a fixed member on the shaft, a screw, a system of gearing, actuated from the rotation of the shaft in the same direction to give a right or left rotation to the screw, and having one portion of the gear system adapted to be held against rotation with the other portion operative for moving the traveling member in one or the other direction on the shaft, substantially as described.

5. In a thrust or end movement mechanism, the combination of a revoluble power-transmitting shaft, a fixed member on the shaft, a traveling member mounted on and revolving with the shaft and endwise slidable thereon, and means comprising gears carried by the sliding member and shaft and a right and left revoluble screw actuated from the gears, for giving the traveling sliding member a thrust or end movement in one or the other direction on the shaft without changing the direction of rotation of the shaft, substantially as described.

6. In a thrust or end movement mechanism, the combination of a revoluble power-transmitting shaft, a fixed member on the shaft, a traveling member mounted on and revolving with the shaft and endwise slidable thereon, and a controllable gear and right and left revoluble screw constituting a connection between the traveling member and the fixed member, actuated through the revolving of the shaft in the same direction to operate and move the sliding member in one or the other direction on the shaft, substantially as described.

7. In a thrust or end movement mechanism, the combination of a revoluble power-transmitting shaft, a traveling member mounted on and revolving with the shaft and endwise slidable thereon, a fixed member on the shaft, a pair of stop-plates, a gear connection actuated from the stop-plates and the rotation of the shaft and operating between the slidable traveling member and the fixed member to move the traveling member in one or the other direction on the shaft, substantially as described.

8. In a thrust or end movement mechanism, the combination of a revoluble power-transmitting shaft, a traveling member mounted on and revoluble with the shaft and endwise slidable thereon, a fixed member on the shaft, a pair of stop-plates, a gear system controlled by the stop-plates to have one section thereof inoperative with the other section operative, and actuated from the rotation of the shaft to move the traveling member in one or the other direction on the shaft, with the shaft revolving in one direction, substantially as described.

9. In a thrust or end movement mechanism, the combination of a revoluble power-transmitting shaft, a sleeve encircling the shaft and endwise slidable thereon, and means comprising gears and a right or left revoluble screw, for giving the sleeve a thrust or end movement in one or the other direction on the shaft from the rotation of the shaft in the same direction, substantially as described.

10. In a thrust or end movement mechanism, the combination of a revoluble power-transmitting shaft, a sleeve encircling the shaft and endwise slidable thereon, and a gear connection between the sleeve and the shaft, said gear connection adapted to be controlled by friction, for the gear to operate and move the sleeve endwise on the shaft in one or the other direction, substantially as described.

11. In a thrust or end movement mechanism, the combination of a revoluble power-transmitting shaft, a sleeve encircling the shaft and endwise slidable thereon, a pair of stop-plates adapted to be held by friction, a gear connection between the sleeve and the shaft controlled by the stop-plates, and a fixed fulcrum on the shaft with which the gear connection coacts, substantially as described.

12. In a thrust or end movement mechanism, the combination of a revoluble power-transmitting shaft, a sleeve encircling the shaft and endwise slidable thereon, a pair of plates, each plate having a peripheral frictional contact-face, a system of gears between the plates and the shaft, a screw operative from the gears, and a fixed fulcrum on the shaft with which the screw coacts for advancing and receding the sleeve, substantially as described.

13. In a thrust or end movement mechanism, the combination of a revoluble shaft having a thread thereon, a sleeve encircling the shaft and slidable endwise thereon, a traveling screw engaging the thread of the shaft and surrounded by the sleeve, and a gear connection between the sleeve and the traveling screw, actuated by the rotation of the shaft to move the traveling screw in one or the other direction and advance and recede the sleeve, substantially as described.

14. In a thrust or end movement mechanism, the combination of a revoluble power-transmitting shaft, a sleeve encircling the shaft and endwise slidable thereon, a pair of plates, a bevel-gear ring on one of the plates, a bevel-gear ring encircling the sleeve, a pair of bevel-pinions between the pair of bevel-gear rings, a bevel-gear operated from the bevel-pinions, a screw connected with the bevel-gear, and a fixed fulcrum on the shaft with which the screw coacts, substantially as described.

JOHN J. REXROTH.

Witnesses:
   OSCAR W. BOND,
   FRED B. HARVEY.